US009703880B2

(12) United States Patent
Liesche et al.

(10) Patent No.: US 9,703,880 B2
(45) Date of Patent: Jul. 11, 2017

(54) METHOD FOR RECOMMENDING SHORT-CUTS IN ORDER TO EASE AND FASTEN NAVIGATING WITHIN NAVIGATION TOPOLOGY

(75) Inventors: Stefan Liesche, Boeblingen (DE); Andreas Nauerz, Boeblinge (DE)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 12/402,000

(22) Filed: May 18, 2009

(65) Prior Publication Data

US 2009/0222737 A1  Sep. 3, 2009

(30) Foreign Application Priority Data

Sep. 11, 2006  (EP) .................................... 06120465

(51) Int. Cl.
*H04L 29/08* (2006.01)
*G06F 17/30* (2006.01)

(52) U.S. Cl.
CPC ........ *G06F 17/30873* (2013.01); *H04L 67/02* (2013.01); *H04L 67/22* (2013.01); *H04L 67/28* (2013.01)

(58) Field of Classification Search
CPC ......... G06F 17/30716; G06F 17/30873; G06F 17/3089; G06F 17/30861; G06F 11/3414; G06F 2201/875; G06F 17/30867; G06F 17/30902; G06F 3/048; H04L 67/22; H04L 67/025
USPC .................................................. 715/738, 742
See application file for complete search history.

(56) References Cited

U.S. PATENT DOCUMENTS

| | | | | |
|---|---|---|---|---|
| 6,801,223 | B1* | 10/2004 | Abbott et al. | 715/740 |
| 6,847,387 | B2* | 1/2005 | Roth | 715/811 |
| 7,062,511 | B1* | 6/2006 | Poulsen | |
| 2004/0044565 | A1* | 3/2004 | Kumar | G06Q 30/02 705/14.39 |
| 2005/0256860 | A1* | 11/2005 | Eiron | G06F 17/30613 |
| 2005/0267869 | A1 | 12/2005 | Horvitz et al. | |
| 2006/0026191 | A1* | 2/2006 | McSherry | G06F 17/30864 |
| 2006/0074864 | A1* | 4/2006 | Naam | G06F 17/30867 |
| 2007/0033206 | A1* | 2/2007 | Laugier | G06F 17/30864 |
| 2007/0112768 | A1* | 5/2007 | Majumder | G06F 17/30864 |
| 2007/0150464 | A1* | 6/2007 | Brave et al. | 707/5 |

(Continued)

FOREIGN PATENT DOCUMENTS

JP    2000057042    8/1998

OTHER PUBLICATIONS

Selective Markov Models for Predicting Web-Page Accesses, by Mukund Deshpande and George Karypis, Oct. 30, 2000.*

*Primary Examiner* — Tadeese Hailu
(74) *Attorney, Agent, or Firm* — Steven M. Greenberg, Esq.; CRGO LAW

(57) ABSTRACT

Embodiments of the present invention provide a method and system for designing a Web Portal comprising a hierarchical structure of portal pages and portlets for accessing Web contents accessible via the Portal.
The method of the invention tracks the paths across which a user traverses a corresponding navigation topology of a portal in order to learn from the behavior of the user. Subsequently during future sessions in the portal when navigating at the same node of the web portal recommendations can be provided that allow the user to access links to an expected final destination page.

10 Claims, 7 Drawing Sheets

(56) References Cited

U.S. PATENT DOCUMENTS

2007/0198321 A1* 8/2007 Lakshminarayan G06F 17/30864
705/7.33
2008/0010281 A1* 1/2008 Berkhin ............ G06F 17/30864
2008/0201643 A1* 8/2008 Nagaitis et al. .............. 715/738
2008/0222170 A1* 9/2008 Farnham ............... G06F 3/0481

* cited by examiner

PRIOR ART
PORTAL SERVER $$P(p_k | <p_{k-1},\ldots,p_{k-n}>) = \frac{\text{number of times } p_k \text{ followed } <p_{k-1},\ldots,p_{k-n}>}{\sum_j \text{number of times } p_j \text{ followed } <p_{k-1},\ldots,p_{k-n}>}$$

FIG.7A $$\hat{R}_{hd}(e,i) = \frac{hits(e,i)}{T_{slot}}$$

FIG.7B $$\hat{R}_{hd}(e) = \frac{1}{(N_{slots} - (N_{slots}-1)/2)} \sum_{i=0}^{N_{slots}-1} \frac{N_{slots}-i}{N_{slots}} \cdot \hat{R}_{hd}(e,i)$$

FIG.7C $$\hat{R}_{hd}(e) = \frac{1}{T_{slot} \cdot (N_{slots} - (N_{slots}-1)/2)} \sum_{i=0}^{N_{slots}-1} \frac{N_{slots}-i}{N_{slots}} \cdot hits(e,i)$$

FIG.7D $$P(p_{k+1} = q) = \frac{\hat{R}_{hd}(q)}{\sum_j \hat{R}_{hd}(p_j)}$$

FIG.7E $$P(p_k | p_{k-1}) = \frac{\hat{R}_{hd}(p_{k-1} \rightarrow p_k)}{\sum_j \hat{R}_{hd}(p_{k-1} \rightarrow p_j)}$$

FIG.7F $$weighted\_hits(e) = \sum_{i=0}^{N_{slots}-1} \frac{N_{slots}-i}{N_{slots}} \cdot hits(e,i)$$

FIG.7G $$expected\_savings = p \cdot (d-1)^n$$

FIG.7H

METHOD FOR RECOMMENDING SHORT-CUTS IN ORDER TO EASE AND FASTEN NAVIGATING WITHIN NAVIGATION TOPOLOGY

CROSS-REFERENCE TO RELATED APPLICATIONS

This application claims priority under 35 U.S.C. §119(a) to European Patent Application Serial Number 06120465.7, filed Sep. 11, 2006, entitled "METHOD FOR RECOMMENDING SHORT-CUTS IN ORDER TO EASE AND FASTEN NAVIGATING WITHIN NAVIGATION TOPOLOGY", the entirety of which is incorporated herein by reference.

1. BACKGROUND OF THE INVENTION

1.1. Field of the Invention

The present invention relates to the field of network computing, and in particular to method and system for designing a Web Portal or Enterprise Portal comprising a hierarchical structure of portal pages and portlets for accessing Web contents or Enterprise contents accessible via the Portal.

1.2. Description and Disadvantages of Prior Art

FIG. 1 gives a schematic system view on a Portal server implementing such prior art Web Portal.

A prior art Portal as e.g., represented by above IBM WebSphere Portal or by Jetspeed2 Enterprise Portal (www-.Portals.apache.org/jetspeed-2/Portal-design.html) is built by a complex functionality implemented on a network server—for example a Web server 100, the most important elements of which are logic components for user authentication 105, state handling 110, aggregation 170 of fragments, a plurality of Portlets 120—further described below—provided in respective pages 125 with a respective plurality of APIs 130 to a respective Portlet container software 135 for setting them into the common Web page context, and some Portal storage resources 140. The logic components are operatively connected such that data can be exchanged between single components as required. This is roughly depicted in FIG. 1.

In more detail, a Portal engine of the Web server in FIG. 1 implements an aggregation of Portlets 120 based on the underlying Portal model 150, manual layout interface 160 and Portal information such as security settings, user roles, customization settings, and device capabilities. Within the rendered page, the Portal automatically generates the appropriate set of navigation elements based on the Portal model. The Portal engine invokes Portlets during the aggregation as required and when required and uses caching to reduce the number of requests made to Portlets. The prior art IBM WebSphere Portal employs open standards such as the Java Portlet API (application programming interface). It also supports the use of a remote Portlet via the WSRP standard.

The Portlet container 135 is a single control component competent for all Portlets 120, which may control the execution of code residing in each of these Portlets. It provides the runtime environment for the Portlets and facilities for event handling, inter-Portlet messaging, and access to Portlet instance and configuration data, among others. The Portal resources 140 are in particular the Portlets 120 themselves and the pages 125, on which they are aggregated in form of an aggregation of fragments. A Portal database 128 stores the portlet description, this is in detail the portlet description featuring some attributes like portlet name, portlet description, portlet title, portlet short title, and keywords; the portlet interaction interface description, which is often stored in form of WSDL documents. The Portal database also stores the Portal content structure, i.e. the hierarchical structure of portal pages—which may again contain nested pages—and portlets. This data is stored in the database 128 in an adequate representation based on prior art techniques like relational tables.

The before-mentioned aggregation logic 170 includes all steps that are required to assemble a page. Typically, these steps are to load a content structure from storage, to traverse it and to call the instances referenced in the structure in order to obtain their output, which is assembled to a single page.

The content structure may be defined through e.g. Portlet Customization by the administrator.

With specific focus now to the present invention when web applications are visited by a web user, a user is usually displayed a navigation menu that provides some means to access underlying content. A navigation menu is usually structured in a tree-like topology, and users are forced to traverse the tree in order to reach a node matching the content the user is interested in. Specifically, web portals are equipped with such navigation menus which must be used to navigate through all of the contents the web portal provides.

As a matter of fact, not every user is interested in the same content, and hence the structure which is given on a given portal may satisfy the needs of a certain user group, but for many individual users the given topology does not satisfy their needs. Prior art allows to blend-out certain nodes of the topology, i.e. blend-out a page or parts of a page, basically some portlets. This, however is a very inflexible means to better transverse the navigation tree.

1.3. Objectives of the Invention

It is thus an objective of the present invention to provide method and system offering improved web portal navigation.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

In short words, the inventional method tracks the paths a user routes through the navigation topology in order to learn from what the user does. During future sessions when navigating at the same web portal's same node it blends-in recommendations that allow the user to go short-cuts to reach quicker the final destination page, or in graph terminology destination nodes, he is probably interested in, based on what the system has learned, when implementing the inventional method.

In a preferred embodiment a functional component tracks the user behavior, a further component analyzes the user behavior, and a third component displays the recommendations in the web browser user interface and provides the redirection functionality associated with each recommendation (short-cut).

The inventional method provides a set of useful short-cuts for each page in the navigational structure, which short-cuts try to reduce the time and effort needed to navigate through the usual paths as it is known from prior art. The sets of short-cuts are generated dynamically during user navigation, wherein the short-cuts are specifically generated dependant on the current node and preferably also dependant on the past visited nodes. One ore a list of short-cuts is then displayed in a prominent position, preferably in the portal theme.

In order to do that the inventional method builds a model which delivers information about the number of times each link in the navigational structure was followed by the user. This information is used to calculate the probability that the user navigates to a particular page P conditioned by the fact that he is currently at another page Q. Then it predicts which may be the most probable ultimate destination in the current navigation of the user. In this way, the inventional recommendation method tracks, which are the most followed paths for each user, and places recommendations depending on where the user currently navigates, in order to reduce the number of clicks needed to navigate through the most popular navigation paths.

There is a trade-off between the usefulness of the inventional method and the number of short-cuts recommended. The recommendations provided by the inventional method are tailored to a specially focus a prediction of target pages that are quite far away in navigational distance, but which still have a high probability to be the final destination. Thus, basically the inventional method tries to achieve the highest expectable saving in number of clicks for traveling through tree-like navigation trees. When the recommendations provided by the inventional method are a list of short-cuts blended into the theme of the currently used web page, the short-cuts can be reached very easily by the user. Then only a simple click on a short-cut navigates the user to its desired final destination page, or portlet at this page.

According to its broadest aspect the present invention discloses a method and system in a web portal environment for assisting a user during navigation in a given hierarchical navigation topology comprising nodes and edges connecting between said nodes, in which topology a web portal page corresponds to a predetermined topology level and displays one or more portlets, which comprises the steps of:

(a) during navigation of a user and for each page comprised of the navigation in the topology of the web portal automatically sensing information about the navigational behavior of the user, (b) deriving page hits and page target hits from the sensed information, wherein page hits are defined for pages clicked for reaching another page, and page target hits are defined for pages a user clicks in order to perform a page-specific task or to receive some page-specific information, (c) using a predefined metric based on the sensed information for generating a utility ranking for the web pages comprised of the user navigation, wherein the utility ranking calculation of a page includes a time-related weighting prioritizing newly used pages, (d) tracking the current navigational position during the user's navigation, (e) calculating for the current position and a plurality of target pages a probability measure to navigate to a respective one of the target pages, wherein the target pages are obtained by the utility ranking, (f) calculating an expected saving factor for each target page based on the target page utility and on the navigational distance between the current page and the target page, (g) defining at least one shortcut including the respective direct link to at least one of the target pages having a high expected saving factor, (h) displaying the short cut as a clickable link to the user.

To sense information is meant to include to use all particular interfaces to "sensors" and read the information provided by them. Thus, time information is sensed from the system clock, date information is sensed from any date source of the Web server system, the user Id is sensed from a preceding log-in procedure, etc.

Examples for metrics in use are:

The amount of times (i.e. how often) a user has interacted with an element of a page, or the amount of times (i.e. how often) a user was viewing a page, or the frequency of visits of a page, or the current location of a user, or the hit time, month and day of week, etc. . . .

The term "utility" is meant to denote the importance of a web page for a user. This importance is tried to be captured by above metrics. Of course, a further, importance parameter can also be used which is independent of the above metrics, if that seems useful to any use case in question.

The time-related weighting reflects the use changes which influence the user behavior slightly but usually steadily.

The current navigational position may be defined as a page URL, or a portlet URL.

A probability measure may be defined mathematically as a relation between specific page hits and overall page hits. Further, it may also be defined in a different way including some extensions to this approach. It follows the basic idea to reflect the importance of a web page.

An expected saving factor reflects the user's work to reach a desired target page or target portlet and its relevance for the user, as long as this may be determined by means of a computer program. Certain aspects may be stressed in relation to others, for example, those portlets which are selected by a user probably in time-critical situations.

3. BRIEF DESCRIPTION OF THE DRAWINGS

The present invention is illustrated by way of example and is not limited by the shape of the figures of the drawings in which:

FIG. 7A to 7H are formulae, describing a preferred implementation of the calculation of expected savings according to the invention.

4. DETAILED DESCRIPTION OF THE PREFERRED EMBODIMENT

With general reference to the figures and with special reference now to FIG. 2 a preferred embodiment of the present invention will be described in more detail next below.

Figure 2:
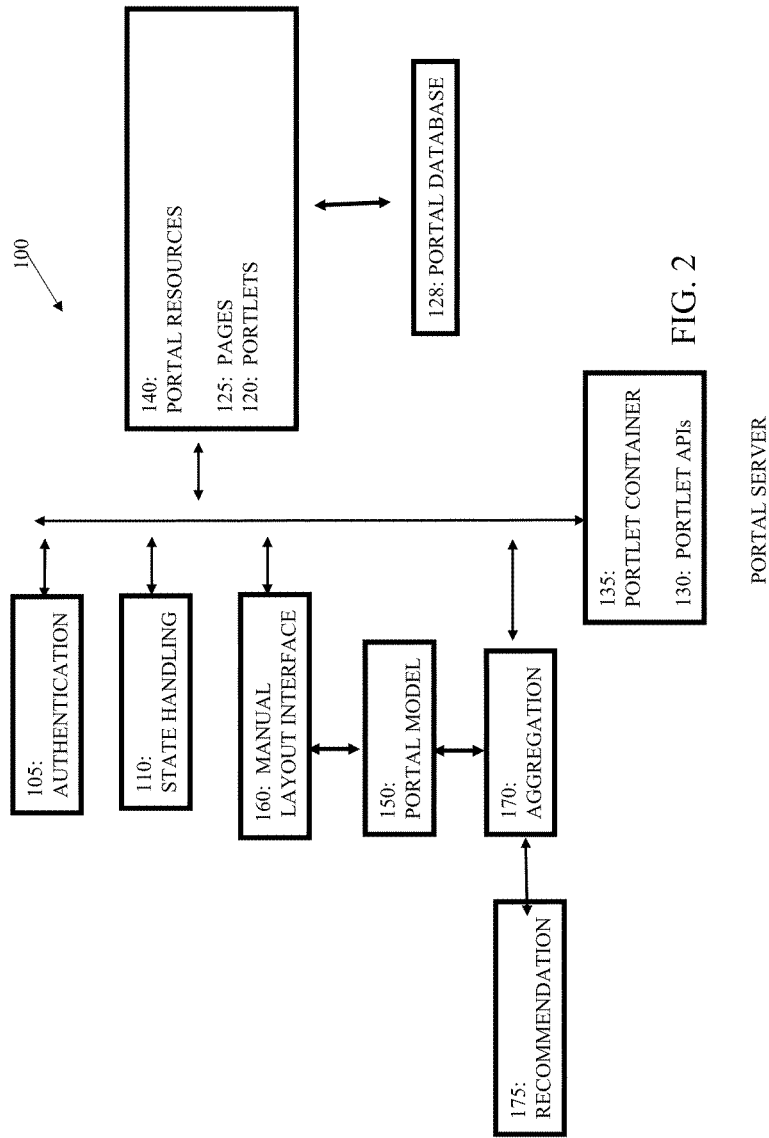
FIG. 2 is a schematic block diagram representation of a portal server according to a specific embodiment of the invention illustrating structural components implemented therein.

FIG. 2 shows an additional inventional component 175, built-in into a prior art portal server and cooperating closely with the aggregation component 170 via a respective programming interface.

Figure 3:
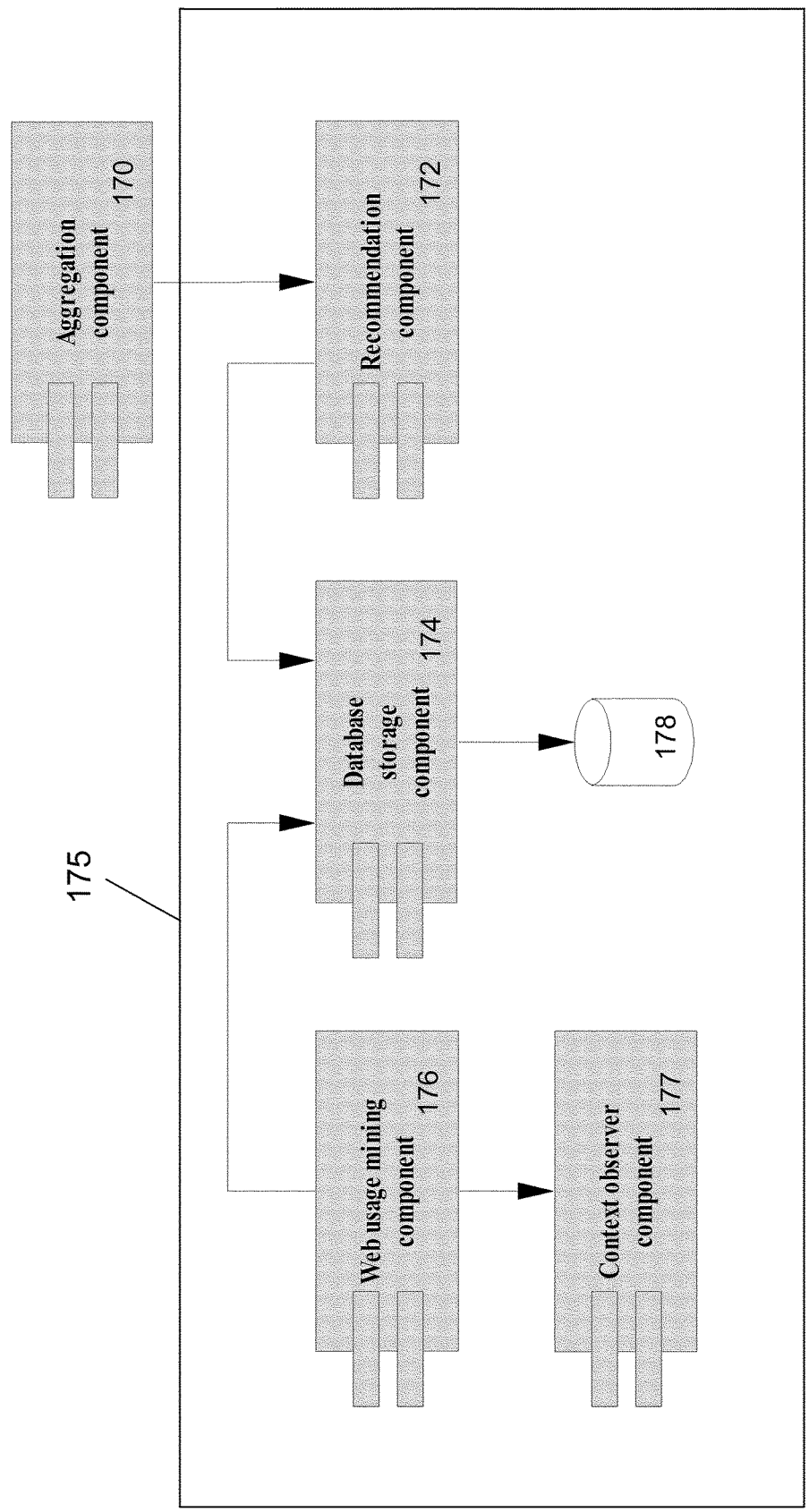
FIG. 3 is a schematic diagram illustrating a zoom-in into box 175 of FIG. 2.

With particular reference to FIG. 3 the before-mentioned aggregation component 170 controls the further functionalities depicted in boxes 172, 174, 176, 177 and 178. It further displays a given topology of a portal to a portal-user.

A web-usage mining component 176 has a read interface to the web-server's inbox, which receives a user request resulting from a user clicking somewhere at a link visible on the currently used web-page. Further, the component 176 has an interface to the web-server's clock in order to store the arrival times of a user request. Via these interfaces the web-usage mining component is notified on each user interaction performed by a user when navigating certain portal topology. Component 176 calculates the before mentioned hit-values and target hit-values, associated with a given web-page and associated with a given context and invokes the database storage component 174 in order to perform a complete set-off sensing information, while the user is interacting with the web-portal.

A context observer component 177 is provided according to this embodiment in order to determine context attributes for defining the currently used context. In order to do that component 177 has respective functional interfaces in order to be unable to request exact time information, date information, to identify the device type currently in use by the web-portal-visitor, and possibly further information derivable or input by any other sensor device, like for example a GPS sensor element. Component 177 feeds any context information to the web-usage mining component 176 in order to unable component 176 to store current sensing information with the respective correct context.

Figure 1:
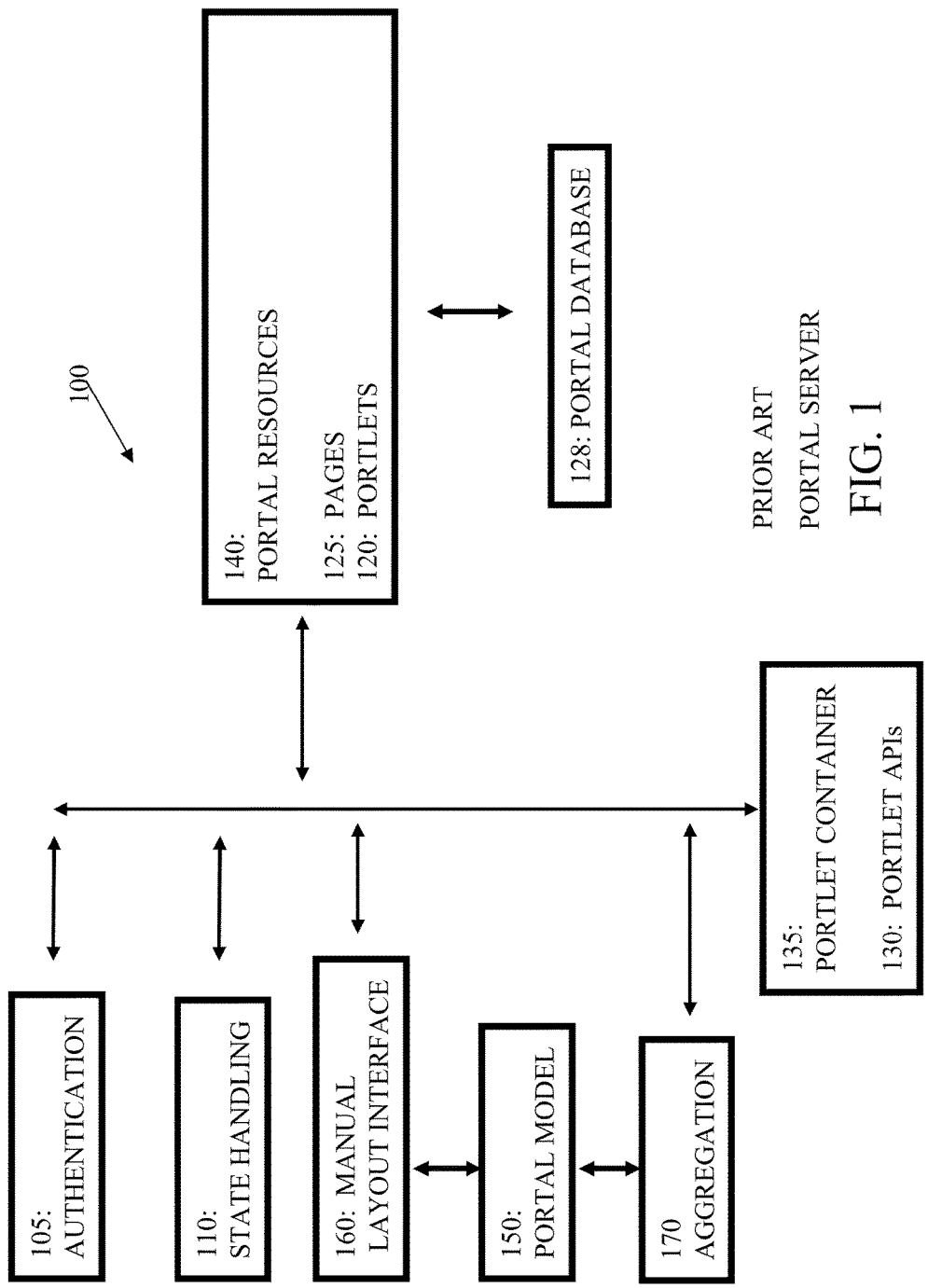
FIG. 1 is a schematic diagram illustrating the structural components of a prior art portal server including lines of interactions.

A database storage component 174 is provided according to this preferred implementation for each user which stores the difference between a user-specific topology and the original topology which is also basically stored on the web server physically. Preferably, for this task an additional database table of a prior art portal database is provided. This table is denoted as 178, where the database is denoted as 128 in FIGS. 1 and 2. Each time, when a user has successfully logged-in the user-specific data stored in this specific database table 178 is read and evaluated by a dynamic assembly transformation component 172 in order to reconstruct the user-specific navigation topology.

Figure 4:
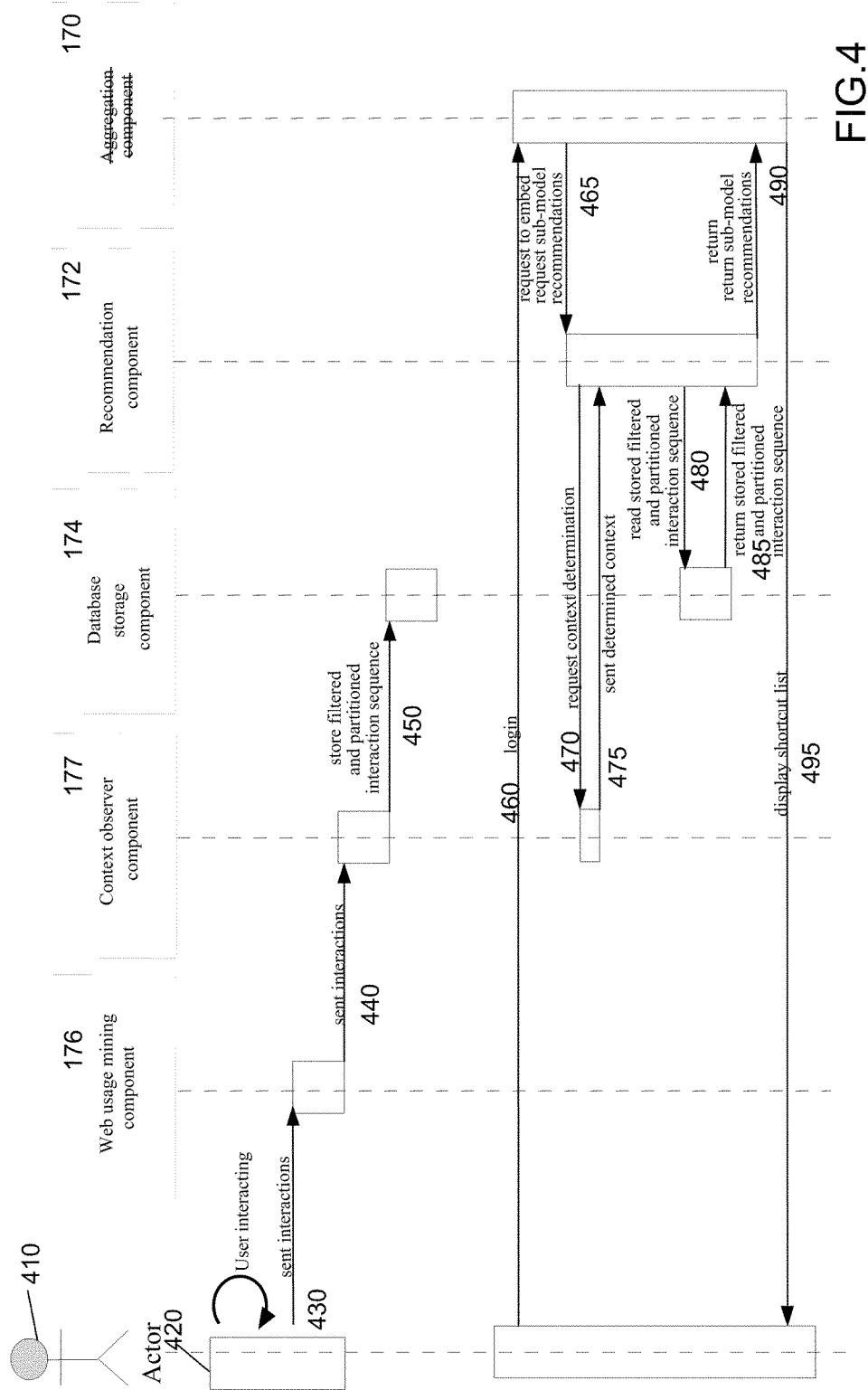
FIG. 4 is a schematic interaction diagram illustrating a sequence of actions performed by a user (actor) and the components implemented by the inventional method, as illustrated in FIG. 3.

With further reference now to FIG. 4 the interaction between the portal-visitor (user or actor 410) and the before mentioned components 170 to 177 are described in more detail next below:

The user 410 interacts with the web-portal web-pages. This interactions includes multiple repeated actions, for example clicking a link, clicking a portal, clicking any resource which can be clicked on a web-page. In order to illustrate the plurality of interactions, the respective arrow 420 is symbolized as a loop symbol. For each interaction the following procedure will be performed:

A current interaction is notified to the web-usage mining component 176. Such notification includes a user-ID, which is obtainable after a log-in of the current user and it includes information which node of which page was clicked and when this has occurred. Thus, a respective data set includes user-ID, node-ID, page-ID and time and date information. Optionally, of course it may include also device type information from which one can derive if the user uses PDA or a notebook or a desktop computer, respectively. This is done in step 430.

All data is send to the context observer component 177, see step 440, in order to determine the actually used context, see step 440 and above step 430. When the data collection is complete, it is stored in a step 450 within the database 178, by the database storage component 174.

Then, in a next step the same user is assumed to log-in again, see step 460. In this case the aggregation component 170 invokes a mechanism which evaluates the user-ID, if available the currently used device-ID and other context information (see above).

Then, aggregation component 170 requests to embed recommendation (to be generated according to the invention) into the theme of the current web page see step 465.

Transformation component 172 will then request, step 470, the current determination of the currently used context. It directs a respective request to the context observer component 177, which reads the current context data from the last request header, and from other input sources, such as system time, in order to deliver time stamps, etc. It receives this context on a subsequent step 475.

The recommendation component 172 then reads the stored and filtered interaction sequence from the database, see step 480, 485, and generates the recommendations. Details, how these recommendations are generated, are described in more detail further below.

Then the recommendation component at step 490, 495 returns those recommendations to the aggregation component 170 which displays it at the current web page theme.

Figure 5:
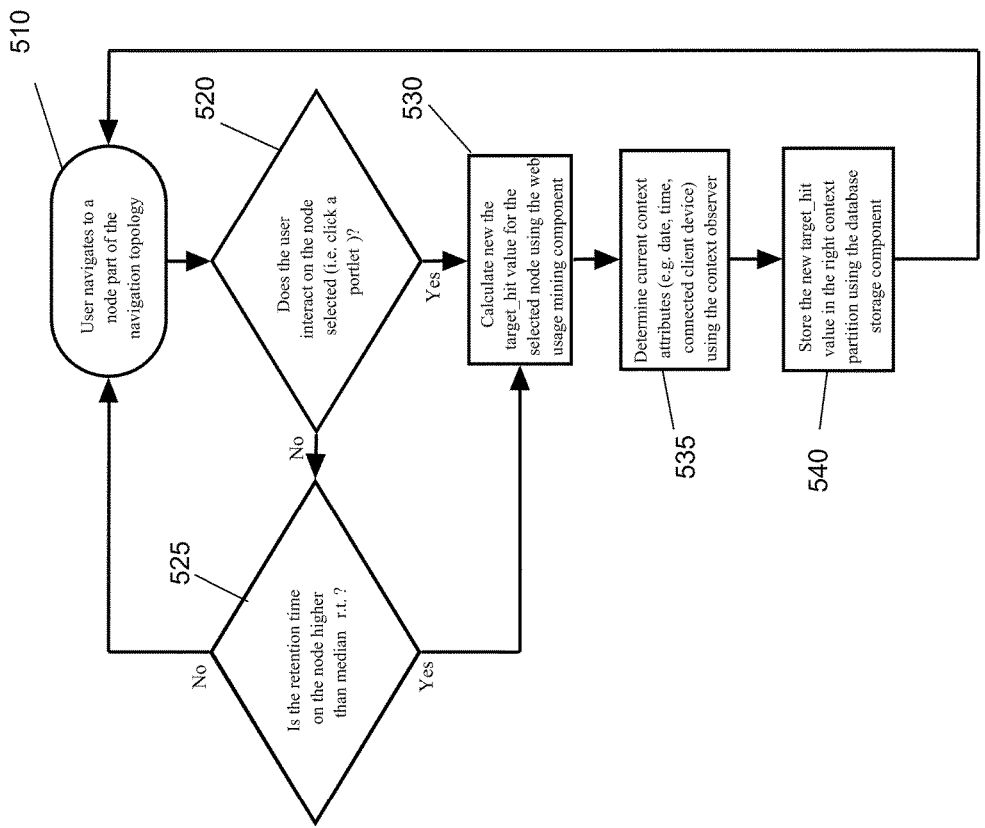
FIG. 5 is a schematic diagram illustrating the control flow of a preferred embodiment of the inventional method during observation of the user behavior when navigating on a web portal topology.

Next and with reference to FIG. 5, details of the user behavior observation are described:

In a step of sequence of steps 510 a user navigates to a node part of the navigation topology. This node part can be any clickable item on the page. Then, a check 520 is performed testing if the user interacts on a certain, selected node, for example it is tested if he clicks a portlet. In the NO case a so-called retention time is calculated which is associated with this specific selected node based on the time associated with the click done in step 520 and the time of the next, subsequent click associated with a user request and received at the inbox of the web server. If the retention time which will be normally the difference of both times is higher than a pre-calculated median retention time it is branched to step 530. If not it is branched back to step 510. Also in the YES case of decision 520 step 530 is entered. In step 530 the target hit value for the selected node is calculated newly by using the web-usage mining component 176.

Then in a next step 535 the currently context attributes are determined using the context observer component 177. Finally, in a step 540 the new target hit value is stored in the proper context partition using the database storage component 174. Then it is branched back to step 510 in order to observe the next user interaction.

Figure 6:
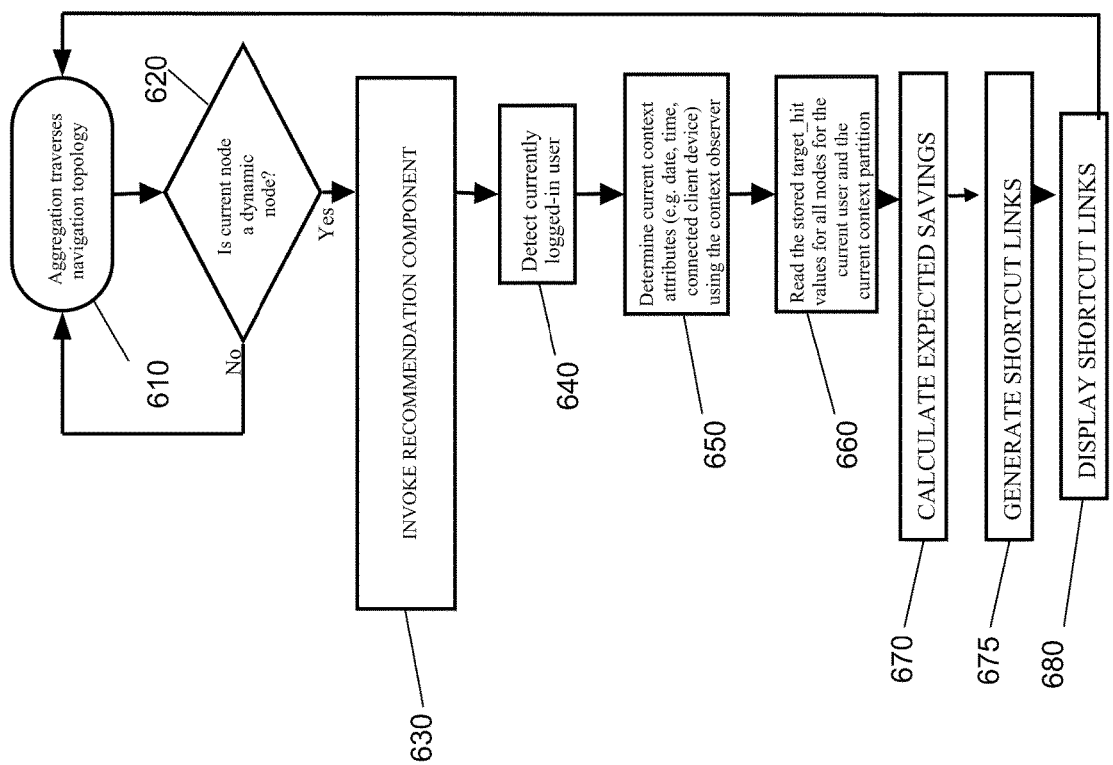
FIG. 6 is a schematic control flow diagram illustrating the essential steps performed in a preferred embodiment of the inventional method, when short-cuts are generated and displayed to the user dynamically during navigation.

FIG. 6 is a control flow diagram illustrating the most essential steps of the inventional method when generating a short-cut list for a given navigation node. With reference to FIG. 6 the control-flow when creating short-cuts to target pages will be described in more detail:

Aggregation component 170 is assumed to traverse a given portal navigation topology. This is done in close relationship to the user actions done and sent by the inventional method, see step 610.

For each page the following actions are performed:

In step 620 a loop condition is tested in order to do the following loop body for all web pages the user navigates to:

In a step 630 the aggregation component 170 invokes the recommendation component 172.

Then in a next step 640 the user-ID of the currently logged-in user is detected and evaluated, in step 650 the respective current context attributes (date, time used client device) is determined by using the context observer component 177.

Then in a next step 660 the stored target hit values for all nodes for the current user and the current context partition are read and evaluated.

In step 670 a function calculate "expected saving" is invoked. The output of this function is a list of target nodes of the topology. In a further step 675 this list of target nodes is transformed into a clickable link to a respective target node, thus, possibly a particular link information is provided. By that, a respective short-cut list is generated, wherein each link corresponds to a respective short-cut. Then, in a step 680 those short-cuts are displayed preferably in the theme of the current web page.

Next and with reference to FIGS. 7A to 7H, details are given, describing a preferred implementation of the calculation of expected savings, as mentioned above.

First it is proposed to view the user's navigation through the Portal as a Markov chain. With this model, we assume that pages the user will visit in the future are determined by the current page and the recent visiting history.

Thus, an-order Markov model takes into account the current page and the last n−1 visited pages to determinate the probability of each page to be viewed next.

This model is trained by counting how many times a page pi was visited, after having traversed a determinate path pi−1, . . . pi−n. The probability of following a link pi−1 to pi is then calculated as depicted in FIG. 7A.

Obviously, the complexity of this model and therefore the amount of resources it takes to make the required computation grow with the order of the model. It is suggested that using a first order Markov model provides good results, being even not worthy the benefits of using a higher order if one takes into account the increase in complexity of the model. Thus, in this embodiment, a first order Markov model has been used.

Until this point, the mechanisms explained to model the user were static with the time. That means that given a log file they produce a model of the user from the available data, which is only valid under the circumstances present when these logs were recorded. As the behaviour of the users change with time these models can become obsolete, implicating that some kind of recalculation with an actualised version of the log file would be necessary. Another possibility for a model to become obsolete is a restructuring of the content by the administrator. In that case, a recalculation of the model would be necessary every time a change in the content structure is performed.

To add time sensitivity, a time-weighting mechanism with the following parameters has been designed:

T-relevancy: this is the time we consider the data from the log file to be valid. Thus, data older than that are not taken into account in the model.

N-slots is the number of slots in which the relevancy time is split. These slots are then used to weight the data from the log file. Thus, data recorded in recent time slots are given more weight than data from older ones.

This mechanism tries then to make an estimation of the hit rate for every page and link, instead of just counting the absolute number of hits. The hit rate is calculated by performing a linearly weighted sum of the hit rate estimations for each time slot. So, the hit rate for an element e in a time slot i can be calculated as depicted in FIG. 7B, where T-slot}=T-relevancy/N-slots is the time duration of a slot, wherein e is the element (page or link) for which we are trying to calculate the rate and hits (e,i) is the number of hits this element has received in the time slot i. From now on, we assume slot 0 is the most recent one and slot N−1 the oldest one.

Having performed the hit rate calculation for each time slot, we can get a global hit rate calculation by performing a linearly weighted sum of them as depicted in FIG. 7C:

As the weighting factor decreases with i, more recent hit rate calculations are given more weight than older ones. The constant quotient multiplying the sum works just a normalization factor.

By substituting equation of FIG. 7B into equation of FIG. 7C we finally get a formula according to FIG. 7D.

As time goes by slots are shifted. Older slots are eliminated giving then space for new ones. The rate estimation is recalculated every time a new slot is added, being then the model always updated to the real situation.

The probability calculation in the previous static models is then performed using this rate estimation instead of the absolute value of hits per page/link.

In the case of the unconditional model a formula yields according to FIG. 7E.

In the case of the first order Markov model a formula yields according to FIG. 7F.

If we take a look at the equations of FIG. 7D, 7E, 7F we can see that the constant quotient multiplying the Sum in FIG. 7D becomes irrelevant when performing the probability calculation. Thus, this parameter can be neglected to get an optimized version of the mechanism and just calculate a time-weighted version of the page or link hits as follows from FIG. 7G.

The time duration of a slot is a very important factor for the estimation of an element's hit rate. Choosing a very short interval of time brings to a really quick adaptation since the model is updated every T-slot, but the variance of the model increases. That means that the estimation's quality is reduced, since quick variations in the user behaviour have a huge repercussion in the model. In normal conditions, slots should have a duration around one day.

Obviously, the time of relevancy is also a key factor here. It determines not only the period of time during which actions performed by the user are considered as still valid, but it also determines the number of slots N-slots=T-relevancy/T-slot for which the hit rate is calculated in order to get an estimation of the global rate. Thus, the higher the number of slots the lower is the variance of the model.

The selection of a value for the T-relevancy parameter depends on the type of Portal. So, very dynamic Portals where content or services are outdated quickly and replaced by new ones should have short relevancy times, while Portals with a very static structure should have longer ones.

With respect now to the click distance d between a current, user-navigated node and a target node in a number of clicks only, without including mouse pointer movements, to which target node a short-cut is to be generated by the inventional method, it should be taken into consideration that, the further away a potential target node is from the front page, the more difficult is it to reach that target node. In order to integrate this aspect into the calculation of expected savings, a formula to calculate the expected savings is provided by FIG. 7H, wherein the links saved by the shortcut equals to: distance −1, and wherein p is the probability a user navigates from the current page to the target node.

In this formula, the distance is "discriminated" in front of the probability: while the probability of reaching a node one level deeper in the structure decreases exponentially, the distance between this node and the current one increases only linearly, in case of exponent n=1. In this way, nodes near to the current page are more likely to be recommended than others far away from it.

On the other hand, by taking n>1 we start giving more importance to the number of links saved by the shortcut. That has as a consequence that the system makes more aggressive recommendations, that is, shortcuts to nodes which are further away from the current page.

The skilled reader will appreciate that the before-mentioned embodiments showing certain procedures and proposed sequences of steps are primarily given for demonstrating the inventional method by way of example. Thus, it will be understood that those examples may be varied in various aspects like for example the ordering of steps, the degree of parallelization between steps, the implementation details of the single steps, the form in which data is stored, the way how the grouping of portlets is achieved, etc., and respective further embodiments can be obtained.

The present invention can be realized in hardware, software, or a combination of hardware and software. A portlet arrangement tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following
 a) conversion to another language, code or notation;
 b) reproduction in a different material form.

The invention claimed is:
1. A method in a web portal environment for assisting a user during navigation in a given hierarchical navigation topology comprising nodes and edges connecting between said nodes, in which topology a web portal page (125) corresponds to a predetermined topology level and displays one or more portlets (120), said method comprising the steps of:
 i) during navigation of a user in the topology of said web portal executing in at least one computer system, automatically sensing (520, 525) information about the navigational behavior of said user for each page comprised of said navigation,
 ii) deriving (530) page hits and page target hits from said sensed information, wherein page hits are defined for pages clicked for reaching another page, and page target hits are defined for pages a user clicks in order to perform a page-specific task or to receive some page-specific information,
 iii) using a predefined metric based on said sensed information for generating a utility ranking for the web pages comprised of the user navigation, wherein the utility ranking calculation of a page includes a time-related weighting prioritizing newly used pages,
 iv) tracking (620) the current navigational position during said user's navigation in the web portal by viewing the user's navigation as an n-order Markov chain accounting for a current page and recent viewing history,
 v) utilizing the n-order Markov chain, calculating for said current position and a plurality of target pages a probability that the user will navigate to a respective one of said target pages based upon a number of times the respective one of the target pages has been visited after having traversed a determinate path to the respective one of the target pages, wherein said target pages are obtained by said utility ranking,
 vi) calculating (670) an expected saving factor for each target page based on said target page utility and on the navigational distance between said current page and said target page,
 vii) defining (675) at least one shortcut including the respective direct link to at least one of the target pages having a high expected saving factor,
 viii) displaying (680) said short cut as a clickable link to said user through the web portal, and,
 ix) tracking which are the most followed paths for the user, and placing recommendations depending on where the user currently navigates, in order to reduce a number of clicks needed to navigate through the most popular navigation paths.

2. The method according to claim 1, wherein a page hit is defined by a first click to a page and a subsequent click being done within a predetermined time range T-hit after said first click, and a page target hit being defined by a first click to a page and a subsequent click being done after a predetermined second time range T-target-hit having passed.

3. The method according to claim 1, wherein a list of clickable shortcuts is displayed, which list is ordered according to the amount of the expected saving factor.

4. The method according to claim 1, wherein said calculation of said expected saving factor includes the product of target page utility and navigational distance.

5. The method according to claim 4, wherein said calculation of said expected saving factor includes a power of said product.

6. The method according to claim 1, wherein said shortcut is displayed within the theme of the currently displayed web page.

7. The method according to claim 1, comprising the further steps of:
 a) observing a context from the group of:
  a1) current date,
  a2) current time,
  a3) currently used device type,
 b) storing respective context information for a current user session,
 c) using said context information as a filter for shortcut generation and/or shortcut display.

8. The method of claim 1, wherein the n-order Markov model is a first order Markov model.

9. A computer program product for assisting a user during navigation in a given hierarchical navigation topology comprising nodes and edges connecting between said nodes, in which topology a web portal page (125) corresponds to a predetermined topology level and displays one or more portlets (120), characterized by a functional component (175), the computer program product comprising a computer readable storage medium having computer readable program code embodied therewith, wherein the computer readable storage medium is not a transitory signal per se, the computer readable program code implementing the steps of:

a) during navigation of a user in the topology of said web portal automatically sensing (520, 525) information about the navigational behavior of said user for each page comprised of said navigation, b) deriving (530) page hits and page target hits from said sensed information, wherein page hits are defined for pages clicked for reaching another page, and page target hits are defined for pages a user clicks in order to perform a page-specific task or to receive some page-specific information, c) using a predefined metric based on said sensed information for generating a utility ranking for the web pages comprised of the user navigation, wherein the utility ranking calculation of a page includes a time-related weighting prioritizing newly used pages, d) tracking (620) the current navigational position during said user's navigation by viewing the user's navigation as an n-order Markov chain accounting for a current page and recent viewing history, e) utilizing the n-order Markov chain, calculating for said current position and a plurality of target pages a probability that the user will navigate to a respective one of said target pages based upon a number of times the respective one of the target pages has been visited after having traversed a determinate path to the respective one of the target pages, wherein said target pages are obtained by said utility ranking, f) calculating (670) an expected saving factor for each target page based on said target page utility and on the navigational distance between said current page and said target page, g) defining (675) at least one shortcut including the respective direct link to at least one of the target pages having a high expected saving factor, h) displaying (680) said short cut as a clickable link to said user, and, i) tracking which are the most followed paths for the user, and placing recommendations depending on where the user currently navigates, in order to reduce a number of clicks needed to navigate through the most popular navigation paths.

10. The computer program product of claim 9, wherein the n-order Markov model is a first order Markov model.